Figure 1:
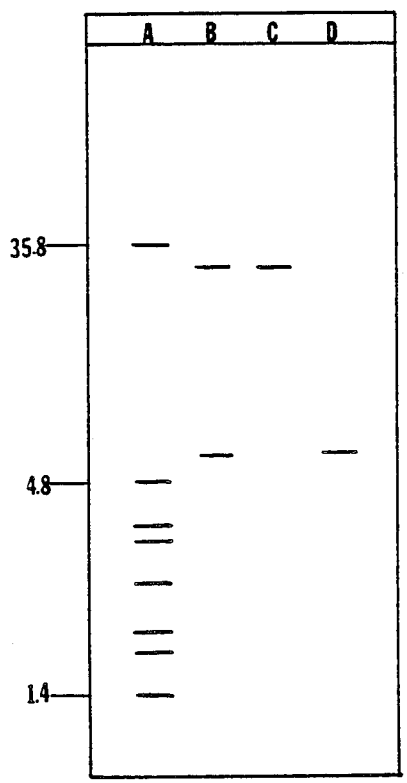

United States Patent [19]

Gonzalez

[11] Patent Number: 4,883,673
[45] Date of Patent: Nov. 28, 1989

[54] METHOD FOR INHIBITING BACTERIAL SPOILAGE AND RESULTING COMPOSITIONS

[75] Inventor: Carlos F. Gonzalez, College Station, Tex.

[73] Assignee: Microlife Technics, Inc., Sarasota, Fla.

[21] Appl. No.: 12,619

[22] Filed: Feb. 9, 1987

[51] Int. Cl.$^4$ .................. A01N 65/00; A23C 9/12
[52] U.S. Cl. ................................ 424/195.1; 426/38; 426/61; 435/178; 435/252.7; 435/822
[58] Field of Search ............... 424/195.1; 426/38, 61; 435/252.7, 170, 822

[56] References Cited

PUBLICATIONS

Chem. Abst. 89:2868a, 1978.
Mundt, J. O. et al., J. Bacteriol. 98: 938–942 (1969).
Pederson, C. S., Bacteriol. Rev. 13: 225–232 (1949).
Diebel, R. H., et al., Appl. Microbiol. 9: 239–243 (1961).
Smith, J. L. et al., J. Food Prot. 46: 997–1006 (1983).
Gonzalez, et al., Appl. Environ. Microbiol. 46: 81–89 (1986).
Daeschel, M. et al., Appl. Environ. Microbiol. 50: 1538–1541 (1985).
Graham, D. C., et al., Appl. Environ. Microbiol. 50: 532–534 (1985).
Garvie, E., Int. J. Syst. Bacteriol. 24: 301–306 (1974).
Barefoot, S. F., et al., Appl. Environ. Microbiol. 45: 1808–1815 (1983).
Gonzalez, et al., Appl. Environ. Microbiol. 51: 105–109 (1986).

Primary Examiner—John W. Rollins
Attorney, Agent, or Firm—Ian C. McLeod

[57] ABSTRACT

A method for protecting food systems from gram-positive bacterial spoilage by incorporating a bacteriocin is described. Foods incorporating the bacteriocin are described, particularly salads and salad dressings.

13 Claims, 1 Drawing Sheet

METHOD FOR INHIBITING BACTERIAL SPOILAGE AND RESULTING COMPOSITIONS

BACKGROUND OF THE INVENTION (1) Summary of the Invention

The present invention relates to the use of a bacteriocin in a food system to inhibit bacterial spoilage by gram positive bacteria, particularly lactobacillii. In particular, the present invention relates to the use of the bacteriocin produced by *Pediococcus acidilactici* NRRL-B-18050 (PAC1.0) in the system, particularly in a refrigerated salad dressing.

(2) Prior Art

The pediococci are a group of gram-positive homofermentative lactic acid bacteria which are known to produce bacteriocin, an inhibitory substance against lactic acid producing bacteria. Saprophytically these organisms are found on vegetable material (Mundt, J. O., W. G. Beattie, and F. R. Weiland, J. Bacteriol. 98:938-942 (1969)). Commercially the pediococci are important in the fermentation of vegetables, (Pederson, C. S., Bacteriol. Rev. 13:225-232 (1949)) and meats (Diebel, R. H., G. D. Wilson, and C. F. Niven, Jr., Appl. Microbiol. 9:239-243 (1961) and Smith, J. L., and S. A. Palumbo, J. Food Prot. 46:997-1006 (1983)).

The prior art has shown the presence of plasmid DNA in pediococci (Gonzalez, C. F., and B. S. Kunka, Appl. Environ. Microbiol. 46:81-89; and Gonzalez, C. F. nd B. S. Kunka, Appl. Environ. Microbiol. 51:105-109 (1986);

Daeschel, M. and T. R. Klaenhammer, Appl. Environ.

Microbiol. 50:1538-1541 (1985); Graham, D. C. and L. L. McKay, Appl. Environ. Microbiol. 50:532-534 (1985)). The prior art has also shown an association between bacteriocin and plasmid DNA in strains of *Pediococcus pentosaceus* and *Pediococcus cerevisiae*, respectively (Daeschel, M. and T. R. Klaenhammer, Appl. Environ. Microbiol. 50:1538-15 (1985); and Graham, D. C. and L. L. McKay., Appl. Environ. Microbiol. 50:532-534 (1985)). There has been no suggestion of the use of the bacteriocin in food systems by the prior art, particularly salad dressings and foods containing them.

OBJECTS

It is therefore an object of the present invention to provide a bacteriocin in a food system to inhibit bacterial spoilage by gram-positive bacteria, particularly lactobacillii. Further it is an object of the present invention to provide an inexpensive and effective method for inhibiting this bacterial spoilage in food systems using the bacteriocin. These and other objects will become increasingly apparent by reference to the following description and the drawing.

IN THE DRAWINGS

FIG. 1 is a line drawing of agarose gel electrophoresis plasmid profiles from selected strains of *Pediococcus acidilactici*.

GENERAL DESCRIPTION

The present invention relates to a method for inhibiting bacterial spoilage by gram-positive bacteria in a food system which comprises: adding a bacteriocin in the food system in an effective amount which inhibits the bacterial spoilage, wherein the bacteriocin is derived from a Pediococcus which produces the bacteriocin.

Further the present invention relates to a composition which comprises a food system which is spoiled by gram-positive bacteria; and a bacteriocin derived from cells of a Pediococcus which produces the bacteriocin, wherein the composition contains an amount of the bacteriocin between about 10 and 100,000 AU of bacteriocin per gram of the liquid sufficient to inhibit spoilage by the gram-positive bacteria and is free of live cells of the Pediococcus.

The preferred bacteriocin used in the present invention is produced by *Pediococcus acidilactici* NRRL-B-18050, which is deposited with the Northern Regional Research Laboratory in Peoria, Il. and also known herein as PAC 1.0. *Pediococcus acidilactici* is a commercially available strain used in meat fermentations. This strain contains a 6.2 Mda plasmid which encodes for the bacteriocin.

The easiest method for providing the bacteriocin is to dry the growth medium after cell growth to produce a powder. The bacteriocin is a proteinaceous material and can be separated from a growth medium by precipitation or by other well known techniques such as reverse osmosis.

The bacteriocin is preferably used in the food system in an amount between 10 and 100,000 Arbitrary Units (AU) of bacteriocin per gram of food. One AU of bacteriocin was defined as 5 microliters of the highest dilution of culture supernatant yielding a definite zone of growth inhibition with a lawn of an indicator strain of a gram-positive bacteria on an agar plate (*P. pentosaceus* FBB-63 formerly known as *Pediococcus cerevisiae* FBB-63).

As used herein the term "food system" includes: salad dressings and cole slaw, macaroni salad, potato salad and other vegetable mixtures which contain salad dressings. Also included is any food which is subject to spoilage by lactobacillii. Usually the foods are refrigerated at 2° C. to 18° C. The term "spoilage" means (1) the reduction of desirable organoleptic properties and can consist of excessive amounts of lactic acid, compounds such as acetic acid, diacetyl and other undesirable flavor compounds; (2) production of gas ($CO_2$); (3) proteolysis and (4) slime. The food looks and smells bad.

SPECIFIC DESCRIPTION

The following discussion and Example 1 show the production and testing of the preferred bacteriocin and then the use of the bacteriocin in salad dressing.

Bacterial Strains and Media: The bacterial strains are listed in Table 1. Carbohydrate fermentation was determined as described previously (Gonzalez, C. F., and B. S. Kunka., Appl. Environ. Microbiol. 46:81-89 (1983)) using medium BM.

TABLE 1

| | Strains used in study | | |
|---|---|---|---|
| Strain | Resident plasmid(s) (MDa) | Relevant phenotype | Comment or reference |
| *Pediococcus acidilactici* | | | |
| PAC1.0 | 23, 6.2 | $Suc^+,Bac^+$ | NRRL-B-18050 |
| PAC1.14 | 23 | $Suc^+,Bac^-$ | $Bac^-,PAC1.0$ |
| PAC1.17 | 6.2 | $Suc^-,Bac^+$ | $Suc^-,PAC1.0$ |
| PAC1.19 | None | $Suc^-,Bac^-$ | $Suc^-,Bac^-$ PAC1.0 |

Abbreviations: $Suc^+$, ability to ferment sucrose; $Bac^+$, ability to produce bacteriocin PA-1; (−) loss of indicated phenotype.

Plasmid isolation and purification: Plasmid DNA was isolated and DNA samples were subjected to agarose gel electrophoresis as previously described. Reference plasmid DNA was prepared as previously described (Gonzalez, C. F., and B. S. Kunka, Appl. Environ. Microbiol. 46:81–89 (1983)).

Curing studies: Stability of plasmid-encoded traits and elimination of plasmid DNA by growth at elevated temperatures was accomplished by methods previously described (Gonzalez, C. F., and B. S. Kunka, Appl. Environ. Microbiol. 46:81–89 (1983)). PAC1.0 to be used in curing experiments was streaked on BM-sucrose. A single acid producing colony was then transferred for use in curing experiments. For curing of the bacteriocin producing phenotype (Bac+), single colonies were taken from a plate streaked for isolated colonies and streaked onto duplicated plates. Isolated colonies streaked on assay plates were screened for the Bac+ phenotype using methods described below. The duplicate plate was used as source of inoculum for curing experiments. Curing was accomplished by growing cells for 18 hours at 45, 47 and 50° C.

Bacteriocin assay: Production of bacteriocin was assayed by spotting cells on MRS agar (Difco Detroit, Michigan), and incubating at 35° C. for 18 hours. Assay plates were exposed to chloroform vapors for 30 minutes to kill the cells and overlaid with soft agar (0.75%) seeded with indicator cells. Plates were incubated at 32° C. for 18 hours. Isolates producing a clear zone of inhibition were considered as producing bacteriocin.

Partial purification of bacteriocin. Four liters of MRS broth (Difco) inoculated at 1% with an 8 h culture of strain PAC1.0 (optical density at 600 nm, 0.60) grown in same medium was incubated static at 35° C. for 18 h. After the 18 h, the pH of the culture was determined and adjusted to pH 6.0. Cells were removed by centrifugation at 16,300×g for 15 min at 5° C. The supernatant was filtered through a 0.45 micrometer filter (Millipore Corp., Bedford, Ma.). The filtered supernatant was assayed for bacteriocin activity by spotting 5 microliters of a serial two-fold dilution series on to MRS plates overlaid with soft agar seeded with indicator cells. Assay plates were incubated at 32° C. The indicator strain was *P. cerevisiae* FBB63 (Graham, D. C. and L. L. McKay, Appl. Environ. Microbiol. 50:532–534 (1985)), reidentified as *P. pentosaceus* using carbohydrate utilization patterns and temperature growth characteristics as described by Garvie (Garvie, E., Int. J. Syst. Bacteriol. 24:301–306 (1974)). The indicator strain is also a bacteriocin producer which is relatively ineffective. One arbitrary unit (AU) of bacteriocin was defined as 5 microliters of the highest dilution of culture supernatant yielding a definite zone of growth inhibition on indicator lawn as discussed previously. The extract titer was expressed as the reciprocal of the highest dilution showing inhibition.

Ammonium sulfate (Sigma Chemical Co., St. Louis, Mo.) was added to the filtered supernatant at 5° C. to 60% (w/v) saturation. After gentle stirring for 18 hours, the precipitate was collected by centrifugation at 16,300×g for 20 min. at 5° C. The precipitate was reconstituted in 80 ml of 0.05 M Tris-maleate (Sigma) buffer pH 6.5 and titered. The reconstituted precipitate was centrifuged to remove particulate matter. The supernatant was titered and then dialyzed against 0.05M Tris-maleate buffer at 5° C. using Spectrapor no. 1 membrane tubing (Spectrum Medical Industries, Inc., Los Angeles, Ca.). The dialyzed material was titered for activity to determine recovery of activity. The partially purified bacteriocin was used in studies and characterized as bacteriocin PA-1.

Effects of heat treatment and enzymes. A partially purified sample of bacteriocin PA-1 (6,400 AU/ml) was assessed for thermostability and enzymatic effects on activity. Bacteriocin was incubated with each enzyme at a final concentration of 500 micrograms/ml for 60 minutes. Incubation in the presence of alpha-chymotrypsin and trypsin was at 25° C., all other enzyme-bacteriocin mixtures were incubated at 37° C. Inactivation of the enzymes was achieved by boiling for 3 minutes.

Temperature stability of the bacteriocin was assessed by heating a solution of bacteriocin to 80° C. for 60 minutes, 100° C. for 3 and 10 minutes and 121° C. for 15 minutes. After each treatment bacteriocin samples were assayed for bacteriocin titer.

Enzymes. All enzymes were obtained from Sigma Chemical Co. alpha-chymotrypsin (type II, 47 U/mg) and lipase (type 1, 8.6 U/mg) were dissolved in 0.05 M Tris-hydrochloride (pH 8.0) containing 0.01 M $CaCl_2$; protease (type V, 1 U/mg), lysozyme (grade I, 41,400 U/mg), papain (type III, 109 U/mg and trypsin (type IX, 15,000 U/mg were dissolved in 0.05 M Tris-hydrochloride pH 8.0; pepsin (3,200 U/mg) was dissolved in 0.2 M citrate buffer (pH 6.0); phospolipase C (type I, 10 U/mg) was dissolved in 0.05 M Tris-hydrochloride (pH 7.10) containing 0.01 M $CaCl_2$.

pH stability of activity. One ml of partially purified PA-1 was dialyzed against buffers of various pH. The bacteriocin solution (6,400 AUml) was dialyzed for 18 h with two changes against 0.05 M glycine-hydrochloride buffer pH 2.0, 0.05 1 M citrate buffer pH 3–6, 0.05 M Tris-hydrochloride pH 7–9 and 0.05 M carbonate-bicarbonate buffer pH 10–11. After dialysis contents of tubing were assayed for activity.

Adsorption studies. Adsorption of bacteriocin PA-1 to sensitive and resistance cells was accomplished by procedures similar to those described by Barefoot and Klaenhammer (Barefoot, S. F., and T. R. Klaenhammer, Appl. Environ. Microbiol. 45:1808–1815 (1983)). Cells from overnight MRS (Difco) broth cultures, were subcultured in 25 ml of fresh broth and grown to a concentration of $10^8$ CFU/ml. Cells were harvested by centrifugation, washed twice in 0.05 M tris-maleate pH 6.5 and resuspended in 0.5 ml of the same buffer containing the bacteriocin at 200 AU/ml. The mixture was incubated on ice for 1 hr. Cells were removed by centrifugation followed by filtration through 0.22 micropore filter (Millipore). The titer of activity in cell-free filtrate was determined. Controls included incubation of the bacteriocin PA-1 without cells and cells with no bacteriocin PA-1 added.

Plasmid associated phenotypes. FIG. 1 is an agarose gel electrophoresis of CsCl-ethidium bromide-purified plasmid DNA from *P. acidilactici* PAC 1.0 and derivative strains. Electrophoresis of DNA was in 0.7% agarose at 100V for 2 h. (A) *Escherichia coli* V517 (bands identified top to bottom) 35.8, 4.8, 3.7, 3.4, 2.6, 2.0, 1.8 and 1.4 MDa covalently closed circular DNA. (B) PAC 1.0 Suc+, Bac+; (C) PAC 1.14 Suc+, Bac−; (D) PAC 1.17 Suc−, Bac+. The molecular mass of *P. acidilactici* plasmid DNA is shown in Table 1. The molecular mass of standard plasmid DNA is indicated.

*P. acidilactici* PAC1.0 had previously been reported (Gonzalez, C. F., and B. S. Kunka, Appl. Environ. Microbiol. 46:81–89 (1983)) to contain two plasmids of 23 and 6.2 MDa designated as pSRQ10 and pSRQ11, respectively (FIG. 1, lane B). Strain PAC 1.0 expresses a sucrose fermenting (Suc+) phenotype and produces a bacteriocin. The effect of growth at elevated temperature on the stability of the Suc+ phenotype was evaluated by growing PAC1.0 at 45, 47 and 50° C. Individual colonies obtained from each of the treatments were evaluated for the (Suc+) phenotype. Non-sucrose fermenting (Suc−) segregants were detected at frequencies of 1.1±0.1, 1.4±0.1 and 4.7±0.02% from growth at 45, 47 and 50° C., respectively. Representative Suc+ and Suc− segregants from each of the treatments were surveyed for their plasmid content. Suc+, bacteriocin producing (Bac+) segregants showed the presence of both the 23 and 6.2 MDa plasmids (FIG. 1, lane B). Isolates expressing a Suc−, Bac+ phenotype showed the absence of the 23 MDa plasmid. A representative Suc−, Bac+ strain was designated PAC1.17. (FIG. 1, lane D).

To establish if the remaining plasmid might encode for the Bac+ phenotype, strain PAC1.17 was grown at 45° C. Non-bacteriocin producing (Bac−) segregants of PAC1.17, were obtained at a frequency of 3.7%. A representative Bac−, segregant of PAC1.17 was designated PAC1.19. Strain PAC1.19 showed no detectable plasmid DNA. To further confirm possible association of the Bac− phenotype with plasmid pSRQ11, strain PAC1.0 was grown at 45, 47 and 50° C. Suc+, Bac− segregants of PAC1.0, were obtained at frequencies of 2.4, 2.1, and 2.7%, respectively. Survey lysis of representative Suc+, Bac− isolates showed the presence of plasmid pSRQ10 (23 Mda) and the absence of pSRQ11 (FIG. 1, lane C). A representative Suc+, Bac− isolate was designated PAC1.14.

Inhibitory spectrum of PA-1. The plate assay system with PAC1.0 as a Bac+ strain and PAC1.14 as the control Bac− strain was used to evaluate the spectrum of bacteriocin activity. PAC1.14 was included to detect any inhibitory effects on indicator strains from by-products of metabolism, such as lactic acid. Strain PAC1.0 showed activity against strains of *P. acidilactici*, *P. pentosaceus*, and *Lactobacillus plantarum*, *L. casei* and *Leuconostoc dextranicum*. No activity was observed against *Streptococcus lactis*, *S. lactis* subsp. *diacetylactis*, *S. cremoris* or *S. thermophilus*. The Bac− strain, PAC1.14 showed no sensitivity to PA-1. Strains of *Staphylococcus aureus* showed equal sensitivity to the parent and cured strain indicating that inhibition was probably due to the inhibitory effects of lactic acid. Using partially purified PA-1 (32,000 AU/ml) strains of *Micrococcus varians*, *M. sodonensis*, *Staphylococcus xylosus*, *S. epidermidis*, *S. carnosus*, *Lactobacillus acidophilus*, *L. lactis* and *L. bulgaricus* were tested for sensitivity to the bacteriocin. None of the strains showed sensitivity to pediocin PA-1.

Effect of enzymes, heat treatment and pH. Partially-purified bacteriocin was tested for sensitivity to exposure to various enzymes, heat and pH. PA-1 was sensitive to protease, papain, and alpha-chymotrypsin. Bacteriocin activity was not affected by lipase, phospholipase C, lysozyme, DNase and RNase or heating to 80 and 100° C. Exposure to 121° C. did partially destroy activity (Table 3). Bacteriocin activity was found to be most stable at pH 4–7, with some loss of activity at pH 2, 3, 9 and 10. Most activity was lost at pH 11.

EXAMPLE 1

The following Example 1 shows the use of the bacteriocin PA1 in salad dressing.

TABLE 2

| Desig-nation | Dress-ing[1] | Spoilage Bacteria[2] | PA-1[3] | 0.05M Tris/Malate Buffer |
|---|---|---|---|---|
| Uninoculated control | A | 100 g | — | — | 5 ml |
| Inoculated control | B | 100 g | 0.1 ml(10⁶) | — | 5 ml |
| Inoculated plus bacteriocin PA-1(200 AU/g) | C | 100 g | 0.1 ml(10⁶) | 1 ml | 4 ml |
| Inoculated plus bacteriocin PA-1(1000 AU/g) | D | 100 g | 0.1 ml(10⁶) | 5 ml | — |

[1]Dressing used was Marie's ™ Buttermilk Spice Ranch Dressing. The general composition of the salad dressing was soybean oil, fresh buttermilk, fresh sour cream, whole eggs, distilled vinegar, sugar, salt, buttermilk solids, monosodium glutamate, dehydrated garlic, dehydrated onion, xanthan gum, spices, lemon juice concentrate, parsley and natural flavor.
[2]ATCC35409 *Lactobacillus bifermentans* addition about $1 \times 10^3$ CFU/g of salad dressing.
[3]Bacteriocin PA-1 used was a 60% ammonium sulfate preparation that was dialyzed against 0.05M TRIS-maleate pH 6.8 then filter sterilized. (concentration: 20,000 AU/ml)

The Experiment was conducted at 25° C. (room temperature) for 7 days.

As can be seen from Tables 3 and 4 the bacteriocin from *Pediococcus acidilactici* is very effective in retarding the growth of a common spoilage microorganism, *Lactobacillus bifermentans*.

TABLE 3

| Detectable Activity of Bacteriocin in Salad Dressing | | | |
|---|---|---|---|
| Designation | T-0[a] | T-1[a] | T-5[a] |
| A | — | <100[b] | <100 |
| B | — | <100 | <100 |
| C | ± | 200 | 200 |
| D | + | >800 | ~800 |

[a]Time (days)
[b]PA-1 Activity (AU/g)

TABLE 4

| Bacterial Counts[b] in the Salad Dressing. Time (days) | | | |
|---|---|---|---|
| Designation | T-0[a] | T-1[a] | T-5[a] |
| A | <10[b] | <10 | $1.5 \times 10^2$ |
| B | $3.5 \times 10^3$ | $1.1 \times 10^3$ | $1.5 \times 10^3$ |
| C | $1 \times 10^2$ | <10 | <10 |
| D | <10 | <10 | <10 |

[a]Time (days)
[b]Counts CFU/g (*Lactobacillus bifermentans*)[b]

TABLE 5

| Organoleptic Evaluation of Salad Dressing | | |
|---|---|---|
| Designation | T-5[a] | T-7 |
| A | Not spoiled | Not spoiled |
| B | Spoiled[b] | Spoiled |
| C | Not spoiled | Not spoiled |
| D | Not spoiled | Not spoiled |

[a]Time (days)
[b]Acetic acid was detected by smell and taste and gas (CO₂) was observed in the dressing as evidence of spoilage.

The bacteriocin PA-1 was stable in a salad dressing environment. The bacteriocin was effective in reducing the initial load and maintaining this protection over a period of several days. The same results can be achieved in other food systems such as cole slaw, macaroni salad and potato salad, especially where raw foods are mixed with other ingredients which promote the growth of gram-positive bacteria naturally on the raw food.

It is intended that the foregoing description be only illustrative and that the present invention be limited only by the hereinafter appended claims.

I claim:

1. A method for inhibiting gram-positive bacteria in an unspoiled food system which comprises:
   adding a bacteriocin into the unspoiled food system in an effective amount which inhibits the bacteria, wherein the bacteriocin is derived from a *Pediococcus containing DNA derived from a plasmid measuring about* 6.2 Mda which encodes production of the bacteriocin, to provide in the food system between about 10 and 100,000 Au of the bacteriocin per gram of the food system which is sufficient for the bacteriocin to inhibit the Gram-positive bacteria.

2. The method of claim 1 wherein bacteriocin is derived from *Pediococcus acidilactici* NRRL-B-18080.

3. The method of claim 1 wherein the bacteriocin is derived by growth of the Pediococcus in a growth medium to produce the bacteriocin and wherein the growth medium with the bacteriocin is dried to produce a powder.

4. The method of claim 1 wherein the bacteriocin inhibits the Gram-positive bacteria naturally present on raw foods in the food system.

5. The method of claim 4 wherein one of the Gram-positive bacteria is *Lactobacillus bifermentans*.

6. The method of claim 1 wherein between about 10 and 100,000 AU of bacteriocin per gram of the food system is mixed into the food.

7. The method of claim 1 wherein the Pediococcus has been grown in a growth medium, solids are separated from the growth medium to produce an aqueous solution of the bacteriocin, the bacteriocin is precipitated from the aqueous solution by adding excess amount of a salt and the bacteriocin is isolated from the precipitate.

8. The method of claim 7 wherein the salt is ammonium sulfate.

9. The method of claim 1 wherein the Pediococcus is a *Pedioccocus acidilactici* containing a plasmid measuring about 6.2 Mda which encodes for the bacteriocin production.

10. The method of claim 1 wherein the food system is a salad dressing.

11. A composition which comprises:
    (a) an unspoiled food system which is spoiled by gram positive bacteria; and
    (b) a bacteriocin derived from cells of a Pediococcus containing DNA derived from a plasmid measuring about 6.2 Mda which encodes the production of the bacteriocin, wherein the composition contains an amount of the bacteriocin to provide between about 10 and 100,000 AU of the bacteriocin per gram of the food system sufficient for the bacteriocin to inhibit the Gram-positive bacteria.

12. The composition of claim 11 wherein the food system is salad dressing.

13. The composition of claim 11 wherein the bacteriocin is derived from *Pediococcus acidilactici* NRRL-B-18050.

* * * * *

UNITED STATES PATENT AND TRADEMARK OFFICE
CERTIFICATE OF CORRECTION

PATENT NO. : 4,883,673
DATED : November 28, 1989
INVENTOR(S) : Carlos F. Gonzalez It is certified that error appears in the above—identified patent and that said Letters Patent is hereby corrected as shown below:

Column 1, line 30, "F. nd B. S. Kunka" should be --F. and B. S. Kunka--.

Column 1, line 40 "50:1538-15" should be --50:1538-1541--.

Column 4, line 26 "phospolipase" should be --phospholipase--.

Column 6, Table 2, in the fourth column heading "Malate" should be --Maleate--.

Column 7, line 18 "NRRL-B-18080" should be --NRRL-B-18050--.

Signed and Sealed this

Twenty-ninth Day of January, 1991

Attest:

HARRY F. MANBECK, JR.

*Attesting Officer*     *Commissioner of Patents and Trademarks*